(12) United States Patent
Brosen et al.

(10) Patent No.: US 12,518,287 B2
(45) Date of Patent: Jan. 6, 2026

(54) SYSTEMS AND METHODS FOR MANAGING ESCROW FOR PEER-TO-PEER TRANSACTIONS

(71) Applicant: JPMORGAN CHASE BANK, N.A., New York, NY (US)

(72) Inventors: Samuel Brosen, Astoria, NY (US); Sonny Kung, Flushing, NY (US); Jake Donofrio, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 44 days.

(21) Appl. No.: 18/176,448

(22) Filed: Feb. 28, 2023

(65) Prior Publication Data

US 2024/0144288 A1    May 2, 2024

Related U.S. Application Data

(60) Provisional application No. 63/382,093, filed on Nov. 2, 2022.

(51) Int. Cl.
*G06Q 20/42* (2012.01)
*G06Q 20/22* (2012.01)
*G06Q 30/0601* (2023.01)

(52) U.S. Cl.
CPC .......... *G06Q 20/42* (2013.01); *G06Q 20/223* (2013.01); *G06Q 30/0601* (2013.01)

(58) Field of Classification Search
CPC .................................................. G06Q 30/0601

(Continued)

(56) References Cited

U.S. PATENT DOCUMENTS 7,640,169 B2 * 12/2009 Horton ................... G06Q 10/08
   705/1.1
11,636,475 B1 * 4/2023 Calinog ............... G06Q 20/102
   705/26.8

(Continued)

FOREIGN PATENT DOCUMENTS

KR    2010072130 A  *  6/2010  ......... G06Q 30/0623

OTHER PUBLICATIONS

International Search Report and Written Opinion of the International Searching Authority, dated Dec. 8, 2023, from corresponding International Application No. PCT/US2023/075741.

*Primary Examiner* — William E Rankins
(74) *Attorney, Agent, or Firm* — GREENBERG TRAURIG LLP

(57) ABSTRACT

Systems and methods for managing escrow for peer-to-peer transactions are disclosed. A method may include: receiving, at a payment agreement computer program executed by a backend and from a buyer computer program, a selection of a payment agreement option for a purchase involving a good from a seller; receiving, by the payment agreement computer program and from the buyer computer program, a transaction amount and a seller account identifier; transferring, by the payment agreement computer program, the transaction amount from a buyer account to an escrow account; notifying, by the payment agreement computer program, a seller computer program for the seller that the transaction amount is in the escrow account; receiving, by the payment agreement computer program and from the seller computer program, verification that the transaction amount is correct; and transferring, by the payment agreement computer program, the transaction amount from the escrow account to a seller account.

11 Claims, 8 Drawing Sheets

(58) Field of Classification Search
USPC .......................................................... 705/39
See application file for complete search history.

(56) References Cited

U.S. PATENT DOCUMENTS

| | | | |
|---|---|---|---|
| 2009/0210312 A1* | 8/2009 | Frey ................... | G06Q 30/0601 |
| | | | 705/26.1 |
| 2018/0053162 A1* | 2/2018 | Janes ................... | G06Q 20/407 |
| 2021/0241239 A1* | 8/2021 | Ferguson ............. | G06Q 20/351 |
| 2024/0403950 A1* | 12/2024 | Al Humidan ........ | G06Q 20/407 |

\* cited by examiner

SYSTEMS AND METHODS FOR MANAGING ESCROW FOR PEER-TO-PEER TRANSACTIONS

RELATED APPLICATIONS

This application claims priority to, and the benefit of, U.S. Provisional Patent Application Ser. No. 63/382,093, filed Nov. 2, 2022, the disclosure of which is hereby incorporated, by reference, in its entirety.

BACKGROUND OF THE INVENTION

1. Field of the Invention

Embodiments relate to systems and methods for managing escrow for peer-to-peer transactions.

2. Description of the Related Art

Establishing trust between two parties of a transaction is of the utmost importance for the enablement of commerce. To engage in a transaction, the buyer needs to know that they are getting what they pay for, and the seller needs to know that the buyer is good for the money before handing over a good or service. There are well-established buyer and seller protections in place intended to create trust for myriad types of commerce, from credit card payments (chargebacks) to real estate transactions (lawyers holding funds in escrow). With the recent rise of digital payments and online marketplaces (super-charged by the Covid-19 pandemic), buyers and sellers have been given the ability to easily transact with each other directly. However, establishing trust and means of recourse for such peer-to-peer transactions is a challenge. For the buyer paying up front, the product being picked up may not exactly match what was advertised (or may not be given at all). For the seller, the buyer may show up with less cash or otherwise pay less than was previously agreed upon for the exchange of goods.

SUMMARY OF THE INVENTION

Systems and methods for managing escrow for peer-to-peer transactions are disclosed. According to an embodiment, a method for managing peer-to-peer in person transactions may include: (1) receiving, at a payment agreement computer program executed by a backend and from a buyer computer program, a selection of a payment agreement option for a purchase involving a good from a seller; (2) receiving, by the payment agreement computer program and from the buyer computer program, a transaction amount and a seller account identifier; (3) transferring, by the payment agreement computer program, the transaction amount from a buyer account to an escrow account; (4) notifying, by the payment agreement computer program, a seller computer program for the seller that the transaction amount is in the escrow account; (5) receiving, by the payment agreement computer program and from the seller computer program, verification that the transaction amount is correct; and (6) transferring, by the payment agreement computer program, the transaction amount from the escrow account to a seller account.

In one embodiment, the method may also include receiving, by the payment agreement computer program and from the seller computer program, an identification of the seller account.

In one embodiment, the method may also include identifying, by the payment agreement computer program, the seller account using the seller account identifier.

In one embodiment, the seller account identifier may include a phone number or an email address.

In one embodiment, the method may also include receiving, by the payment agreement computer program and from the buyer computer program, an indication that the good is acceptable.

In one embodiment, the method may also include: receiving, by the payment agreement computer program and from the buyer computer program, an indication that the good is not acceptable; receiving, by the payment agreement computer program and from the buyer computer program, a renegotiation amount; and receiving, by the payment agreement computer program and from the seller computer program, acceptance of the renegotiation amount. The payment agreement computer program transfers the renegotiation amount from the escrow account to the seller account and returns a difference between the transaction amount and the renegotiation amount to the buyer account.

In one embodiment, the good or identified on an online marketplace.

In one embodiment, the buyer computer program, the payment agreement computer program, and the seller computer program interface with the online marketplace.

According to another embodiment, a method for managing or peer-to-peer transactions may include: (1) receiving, at a payment agreement computer program executed by a backend and from a buyer computer program, a selection of a payment agreement option for a purchase involving a good from a seller; (2) receiving, by the payment agreement computer program and from the buyer computer program, a transaction amount and a seller account identifier; (3) transferring, by the payment agreement computer program, the transaction amount from a buyer account to an escrow account; (4) notifying, by the payment agreement computer program, a seller computer program for the seller that the transaction amount is in the escrow account; (5) receiving, by the payment agreement computer program and from the seller computer program, verification that the transaction amount is correct; (6) receiving, by the payment agreement computer program and from the seller computer program, verification that the good was delivered; (7) receiving, by the payment agreement computer program and from the buyer computer program, verification that the good is acceptable; and (8) transferring, by the payment agreement computer program, the transaction amount from the escrow account to a seller account.

In one embodiment, the method may also include receiving, by the payment agreement computer program and from the seller computer program, an identification of the seller account.

In one embodiment, the method may also include identifying, by the payment agreement computer program, the seller account using the seller account identifier.

In one embodiment, the seller account identifier may include a phone number or an email address.

In one embodiment, the method may also include receiving, by the payment agreement computer program and from the buyer computer program, an indication that the good is acceptable.

In one embodiment, the method may also include: receiving, by the payment agreement computer program and from the buyer computer program, an indication that the good is not acceptable; receiving, by the payment agreement computer program and from the buyer computer program, a renegotiation amount; and receiving, by the payment agreement computer program and from the seller computer program, acceptance of the renegotiation amount. The payment agreement computer program transfers the renegotiation amount from the escrow account to the seller account and returns a difference between the transaction amount and the renegotiation amount to the buyer account.

In one embodiment, the buyer computer program, the payment agreement computer program, and the seller computer program interface with an online marketplace.

In one embodiment, the good is delivered by a courier, and the buyer computer program is configured to receive an image of the good from the courier, and further including receiving, receiving, by the payment agreement computer program and from the buyer computer program, verification that the image of the good is acceptable.

In one embodiment, the method may also include: receiving, by the payment agreement computer program and from the seller computer program, shipping information for the good; determining, by the payment agreement computer program and by using the shipping information, that the good was not delivered; and refunding, by the payment agreement computer program, the transaction amount to the buyer account.

According to another embodiment, a non-transitory computer readable storage medium, may include instructions stored thereon, which when read and executed by one or more computer processors, cause the one or more computer processors to perform steps comprising: receiving, from a buyer computer program, a selection of a payment agreement option for a purchase involving a good from a seller; receiving, from the buyer computer program, a transaction amount and a seller account identifier; transferring, the transaction amount from a buyer account to an escrow account; notifying, a seller computer program for the seller that the transaction amount is in the escrow account; receiving, from the seller computer program, verification that the transaction amount is correct; and transferring the transaction amount from the escrow account to a seller account.

In one embodiment, the non-transitory computer readable storage medium may also include instructions stored thereon, which when read and executed by one or more computer processors, cause the one or more computer processors to identify the seller account using the seller account identifier.

In one embodiment, the non-transitory computer readable storage medium may also include instructions stored thereon, which when read and executed by one or more computer processors, cause the one or more computer processors to perform steps comprising: receiving, from the buyer computer program, an indication that the good is not acceptable; receiving, from the buyer computer program, a renegotiation amount; and receiving, from the seller computer program, acceptance of the renegotiation amount; and transferring the renegotiation amount from the escrow account to the seller account and returning a difference between the transaction amount and the renegotiation amount to the buyer account.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate to systems and methods for managing escrow for peer-to-peer in person transactions.

Embodiments are directed to an automated payment agreement function to establish trust in peer-to-peer in-person exchanges. For example, upon entering an exchange with a seller through a peer-to-peer marketplace, instead of sending payment to a seller, a buyer may initiate a protected payment via, for example, an embedded option within the marketplace ahead of the exchange (e.g., X days in advance). This embedded payment option may be linked to a financial institution by API and may share all input payment details in order to initiate a protected payment through the financial institution using, for example, a real-time payment mechanism (e.g., a Zelle transfer, bank transfers, etc.). Once initiated, the entered amount of funds may be debited from a buyer's account, and may be tokenized on a distributed ledger using a smart contract. The seller may receive a notification that the agreed upon payment amount is being held in escrow and will be released upon the buyer's receipt of goods. At the point of goods exchange, if the item meets the expectations of the buyer, and the seller acknowledges the agreed upon sale amount, the buyer enters the marketplace to confirm receipt of proper goods (this information may be linked to the financial institution via API). At this point, the smart contract automates the release of the funds that may be tokenized on the distributed ledger and triggers the subsequent real-time payment to the seller.

Figure 1:
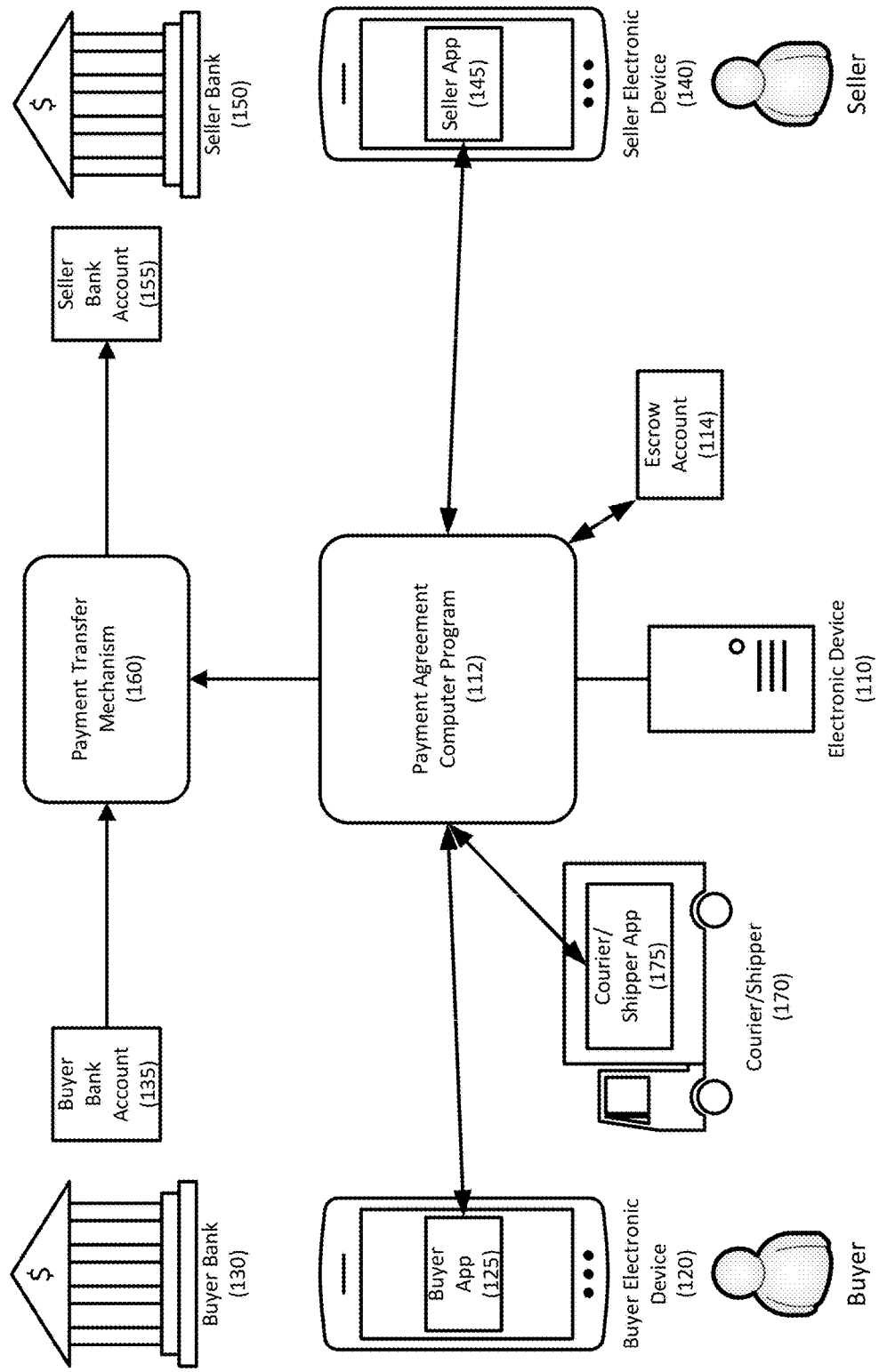
FIG. 1 depicts a system for managing escrow for peer-to-peer transactions according to an embodiment.

Referring to FIG. 1, a system for managing escrow for peer-to-peer transactions is disclosed according to an embodiment. System 100 may include electronic device 110, which may be any suitable electronic device, such as servers (e.g., cloud-based and/or physical), computers (e.g., workstations, desktops, laptops, notebooks, tablets, etc.), smart devices (e.g., smartphones, smart watches, etc.), Internet of Things (IoT) appliances, etc.

Electronic device 110 may be provided by buyer bank 130 or seller bank 150.

Electronic device 110 may execute payment agreement computer program 112, which may be a computer program or application. Payment agreement computer program 112 may interface with buyer application 125 executed by buyer electronic device 120 and/or seller application 145 which may be executed by seller electronic device 140. Payment agreement computer program 112, buyer application 125 and seller application 145 may be distributed applications and part of the same application, or they may be separate programs. In addition, buyer application 125 and/or seller application 145 may be integrated into a third party program, such as a marketplace, a bank application, etc. as a plug-in or extension.

Payment agreement computer program 112 may interface with escrow account 114, which may be a bank account, a distributed ledger (e.g., a blockchain), etc. In one embodiment, a distributed ledger network may execute one or more smart contracts, and the smart contracts may trigger communications with the buyer and/or the seller.

Payment agreement computer program 112 may interface with payment transfer mechanism 160. Payment transfer mechanism may be any suitable mechanism to execute a payment from buyer bank account 135 to seller bank account 155. Examples include Zelle transfers, ACH transfers, Real-Time Payments network, inter-bank transfer (e.g., if the buyer and seller have accounts with the same bank), cryptocurrency exchanges, etc.

In one embodiment, courier or shipper 170 may be provided if the item being purchased is not delivered by in-person delivery. Courier or shipper 170 may execute courier or shipper application 175, which may interface with payment agreement computer program 112.

Figure 2:
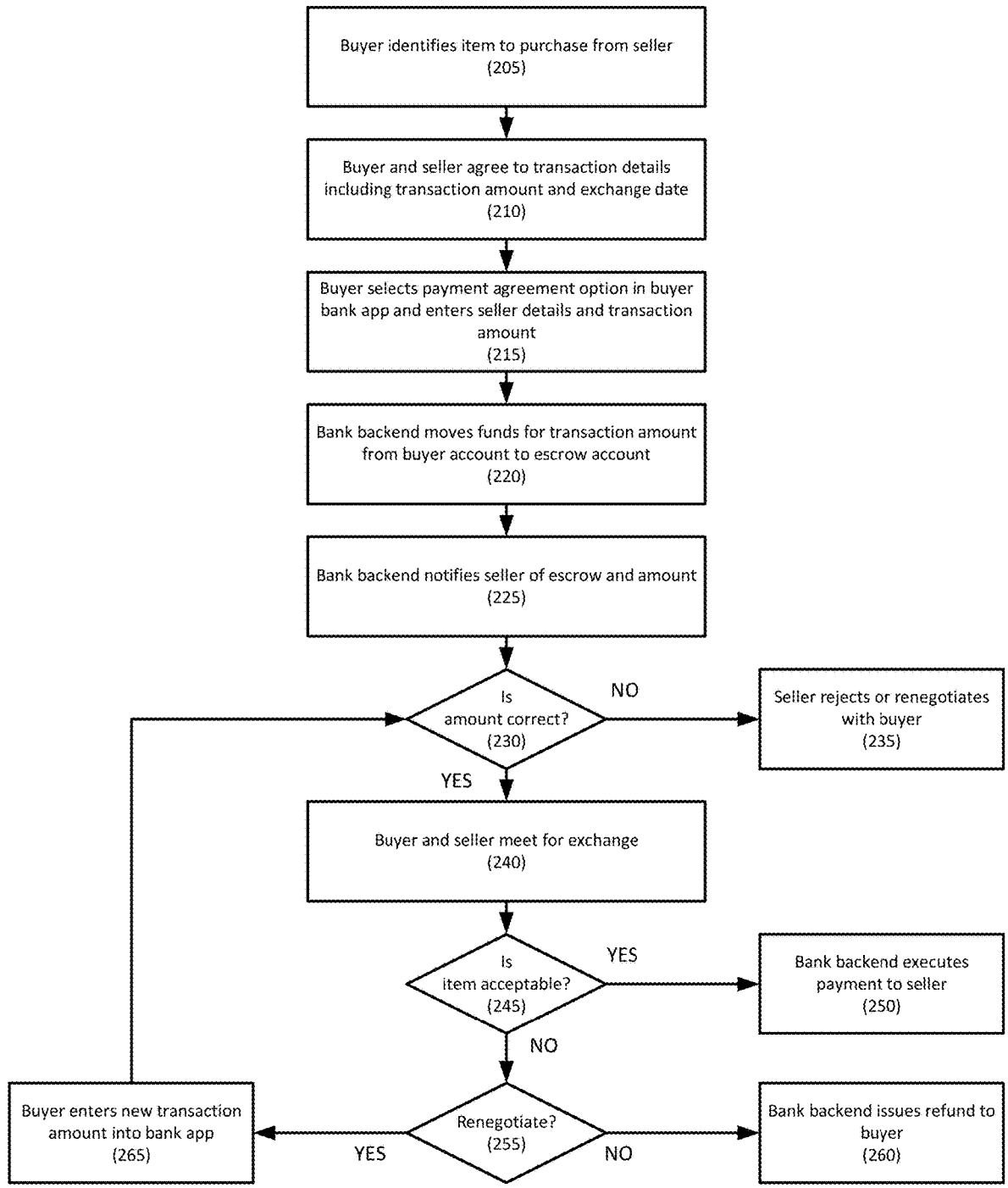
FIG. 2 depicts a method for managing escrow for peer-to-peer in person transactions according to an embodiment.

Referring to FIG. 2, a method for managing escrow for peer-to-peer in person transactions is disclosed according to an embodiment. In one embodiment, the payment agreement option may not be integrated with the marketplace in which the item is available for purchase.

In step 205, a buyer may identify an item to purchase from a seller. For example, the buyer may identify the item on an online marketplace. They may also agree to purchase an item by messaging, phone calls, etc.

In step 210, the buyer and seller may agree to transaction details including a transaction amount and an exchange date. The exchange date is when the buyer and seller agree to meet for the buyer to receive the item.

In step 215, the buyer may select a payment agreement option in a buyer bank application. The buyer may enter seller details, such as a seller account identifier with a payment mechanism and a transaction amount.

In another embodiment, the buyer may enter seller contact information and the seller may provide an account identifier separately. For example, the seller may provide a phone number, a short messaging service (SMS) address, an email address, a token, or any other suitable identifier that may be associated with an account that will receive payment for the item.

In step 220, the bank backend may move funds for transaction amount from a buyer account to an escrow account. In one embodiment, the escrow account may be a bank account with the bank.

In another embodiment, the bank backend may tokenize the funds and write the tokenized funds to an escrow account (e.g., digital wallet) on a distributed ledger network, such as a blockchain network.

In step 225, the bank backend may notify the seller that the funds were moved to an escrow account. The bank backend may also include the transaction amount.

In one embodiment, a smart contract executed by the distributed ledger network may send the notification to the seller.

After receiving the notification, in step 230, the seller may verify that the transaction amount matches the agreed amount and may provide a seller account identifier if not already provided. If the amount is incorrect, in step 235, the seller may reject the transaction or may renegotiate the transaction. If the seller rejects, the bank backend may refund the transaction amount to the buyer.

If the seller decides to renegotiate, the seller may re-engage the buyer and may provide a different price, such as one between the agreed amount and the transaction amount.

If the seller confirms that the transaction amount is correct, in step 240, the buyer and seller may meet in person for the exchange.

In step 245, the buyer may inspect the item for acceptability. For example, the buyer may confirm that the item is correct, that the condition of the item is the same as represented by the seller, etc. If it is acceptable, the buyer may indicate such in, for example, the bank application, and in step 250, the bank backend may cause the transaction amount to be released to the seller. For example, the bank application may communicate approval to release the funds to the seller to the bank backend.

If the item is not acceptable (e.g., it is the incorrect item, is damaged, differs from what the buyer agreed to), in step 255, the parties may agree to renegotiate. If they do not agree to renegotiate, in step 260, the bank may issue a refund from the escrow account to the buyer account.

If the parties do agree to renegotiate, in step 265 the buyer may enter a new transaction amount into the bank application, and the process may return to step 230.

Figure 3:
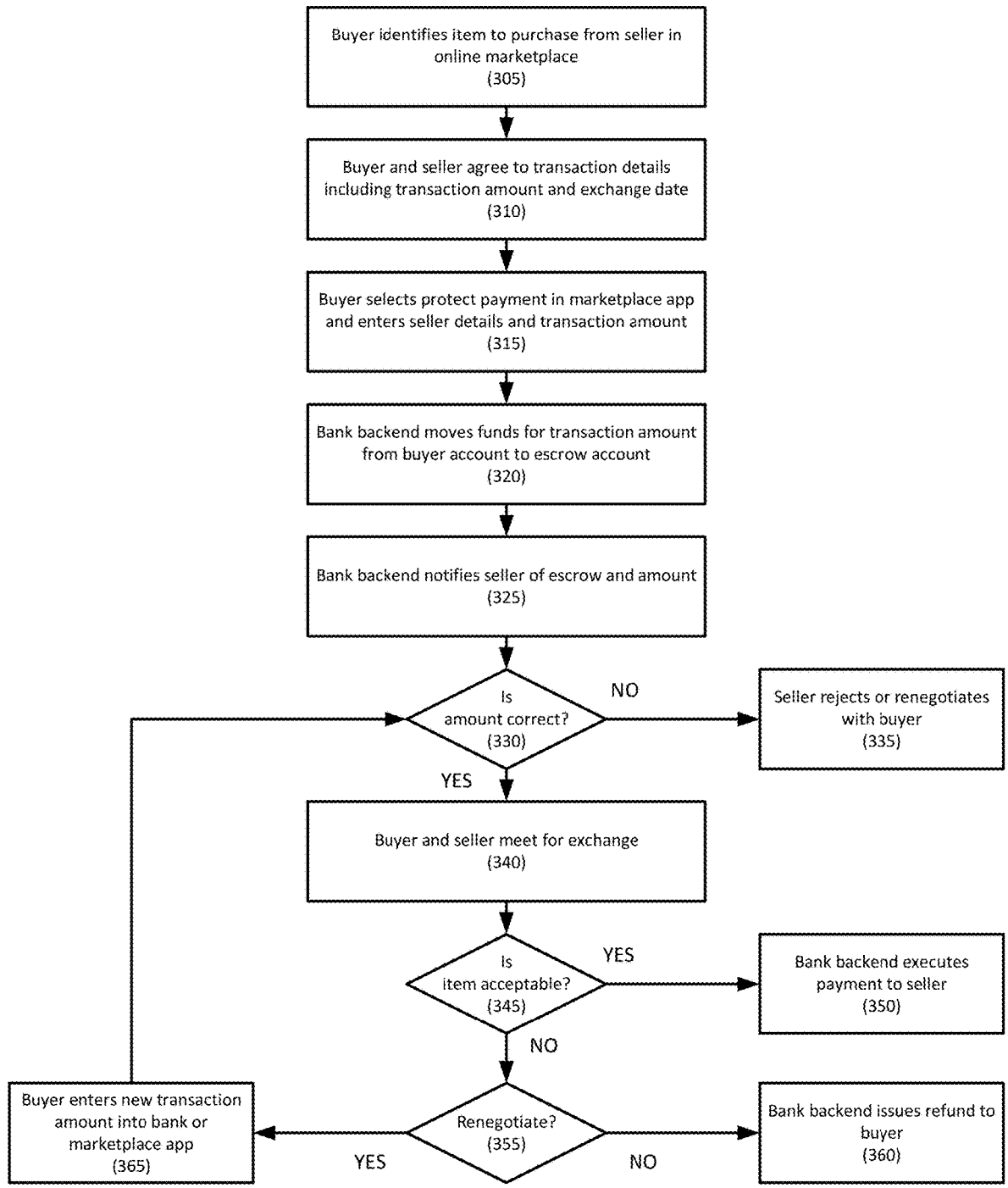
FIG. 3 depicts a method for managing escrow for peer-to-peer online marketplace-based transactions according to an embodiment.

Referring to FIG. 3, a method for managing escrow for peer-to-peer online marketplace-based transactions is disclosed according to an embodiment.

In step 305, a buyer may identify an item to purchase from a seller in an online marketplace application.

In step 310, the buyer and seller may agree to transaction details including a transaction amount and an exchange date. The exchange date is when the buyer and seller agree to meet for the buyer to receive the item.

In step 315, the buyer may select a payment agreement option that may be integrated into the online marketplace application. In one embodiment, the seller details, transaction amount, etc. may automatically be pre-populated.

In one embodiment, the buyer may also select a payment mechanism if more than one payment mechanism is available.

In one embodiment, the buyer may verify the transaction amount and may submit the payment agreement request.

In step 320, the bank backend may move funds for transaction amount from a buyer account to an escrow account. In one embodiment, the escrow account may be a bank account. In one embodiment, the escrow account may be a bank account with the bank.

In another embodiment, the bank backend may tokenize the funds and write them to an escrow account (e.g., digital wallet) on a distributed ledger network, such as a blockchain network.

In step 325, the bank backend may notify the seller that the funds were moved to an escrow account. The bank backend may also include the transaction amount.

In one embodiment, a smart contract executed by the distributed ledger network may send the notification to the seller.

In step 330, the seller may verify the transaction amount matches the agreed amount and may provide a seller account identifier if not already provided. If the amount is incorrect, in step 335, the seller may reject the transaction or may renegotiate. If the seller rejects, the bank backend may refund the transaction amount to the buyer.

If the seller decides to renegotiate, the seller may re-engage the buyer and may provide a different price, such as one between the agreed amount and the transaction amount.

If the seller confirms the transaction amount, in step 340, the buyer and seller may meet in person for the exchange.

In step 345, the buyer may inspect the item for acceptability. For example, the buyer may confirm that the item is correct, that the condition of the item is the same as represented by the seller, etc. If it is acceptable, the buyer may indicate such in, for example, the bank application, and in step 350, the bank backend may cause the transaction amount to be released to the seller.

If the item is not acceptable (e.g., it is the incorrect item, is damaged, differs from what the buyer agreed to), in step 355, the parties may agree to renegotiate. If they do not agree to renegotiate, in step 360, the bank may issue a refund to the buyer account from the escrow account.

If the parties do agree to renegotiate, in step 365 the buyer may enter the new transaction amount into the bank application, and the process may return to step 330.

Figure 4A:
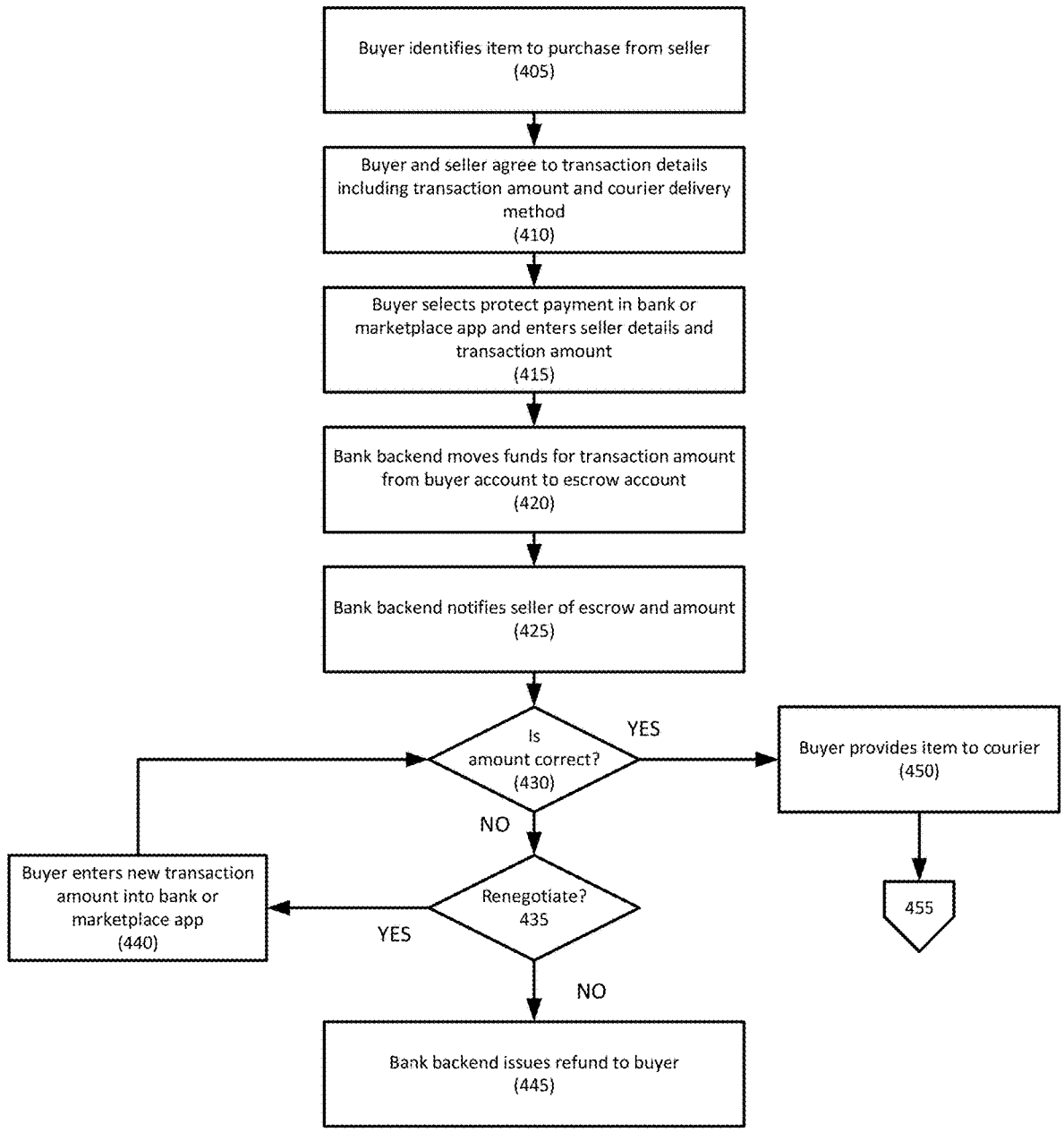
FIGS. 4A and 4B depict a method for managing escrow for peer-to-peer transactions involving a courier according to an embodiment.
Figure 4B:
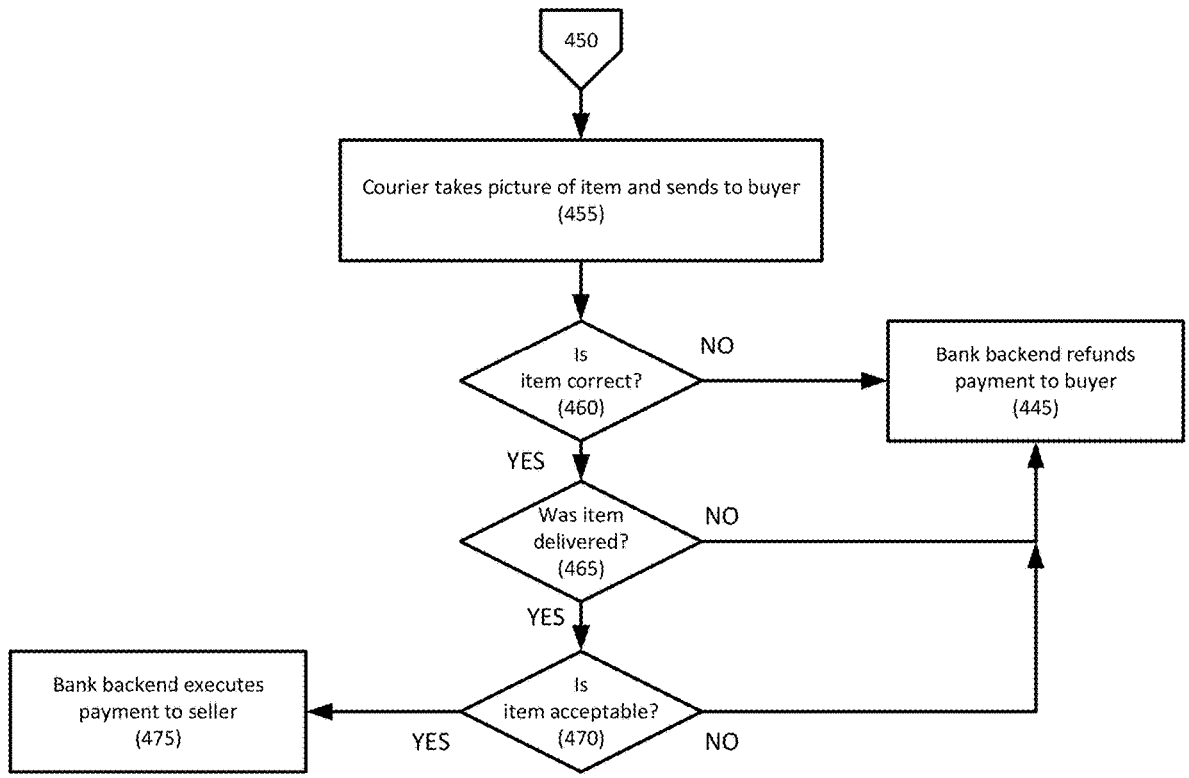

Referring to FIGS. 4A and 4B, a method for managing escrow for peer-to-peer transactions involving a courier is disclosed according to an embodiment.

In step 405, a buyer may identify an item to purchase from a seller in an online marketplace.

In step 410, the buyer and seller may agree to transaction details including a transaction amount and agree to use a courier delivery method.

In step 415, the buyer may select a payment agreement option that may be integrated into the online marketplace application. In one embodiment, the seller details, transaction amount, etc. may automatically be pre-populated.

In one embodiment, the buyer may also select a payment mechanism if more than one payment mechanism is available.

In one embodiment, the buyer may verify the transaction amount matches the agreed amount, and may submit the payment agreement request.

In step 420, the bank backend may move funds for transaction amount from a buyer account to an escrow account. In one embodiment, the escrow account may be a bank account.

In another embodiment, the bank backend may tokenize the funds and write them to an escrow account (e.g., digital wallet) on a distributed ledger network, such as a blockchain network.

In step 425, the bank backend may notify the seller that the funds were moved to an escrow account. The bank backend may also include the transaction amount.

In one embodiment, a smart contract executed by the distributed ledger network may send the notification to the seller.

In step 430, the seller may verify the transaction amount and may provide a seller account identifier if not already provided. If the amount is incorrect, in step 435, the seller may reject the transaction or may renegotiate. If the seller rejects, in step 445, the bank backend may refund the transaction amount to the buyer.

If the buyer and seller renegotiate, in step 440, the buyer may enter a new amount into the application.

If the seller confirms the transaction amount, in step 450, the buyer may provide the item to the courier. For example, the bank backend may notify the courier of a new task (e.g., pick up and delivery of the good) in, for example, a courier application. The courier application may interface with the bank backend. Once receiving the notification, the courier may go to the location of the goods to pick up the item.

In step 455, the courier may take a picture of the item and may send the picture to the buyer. For example, the courier may take the picture using the courier application and may send the picture to the buyer's application. The picture may be routed through the bank backend.

In step 460, the buyer may confirm in the application that the item in the picture is the correct item, in the agreed-upon condition, etc.

If the item is incorrect or not in the agreed-upon condition, in step 445, the bank backend may issue a refund from the escrow account to the buyer account.

If the item is correct and in the agreed-upon condition, application may instruct the courier to deliver the item.

In one embodiment, the courier may indicate delivery in the courier application. Once the bank backend receives the indication the bank backend may inform the buyer of the delivery.

In step 465, if the courier does not deliver the item, after a passage of time, in step 445, the bank backend may refund the payment to the buyer.

If the item was delivered, in step 470, the buyer may inspect the item and confirm that the item is acceptable. If the item is acceptable, in step 475, the bank backend may execute payment to the seller.

If the item is not acceptable, in step 445, the bank backend may refund the payment to the buyer.

Figure 5A:
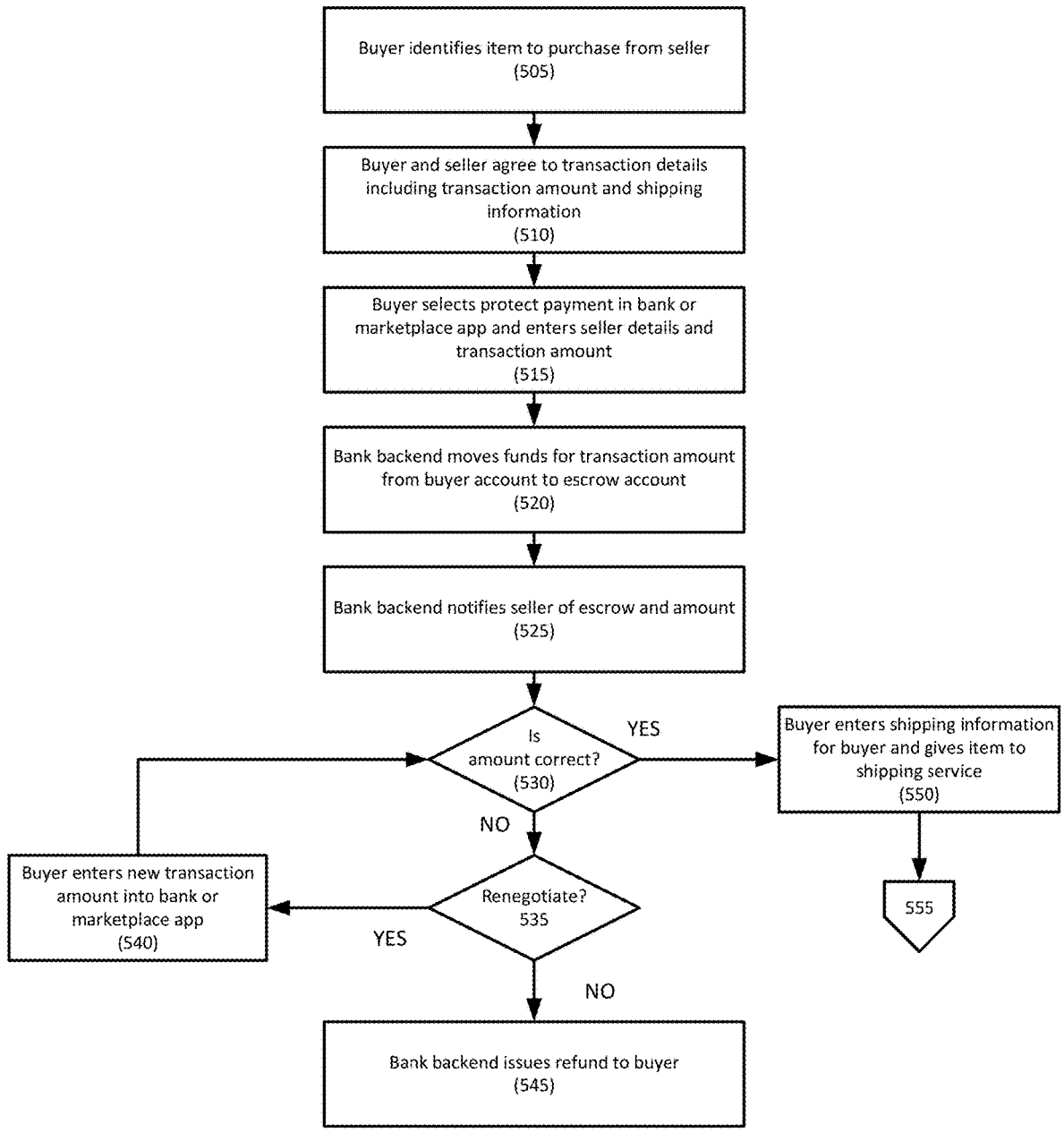
FIGS. 5A and 5B depict a method for managing escrow for peer-to-peer transactions involving a shipper according to an embodiment.
Figure 5B:
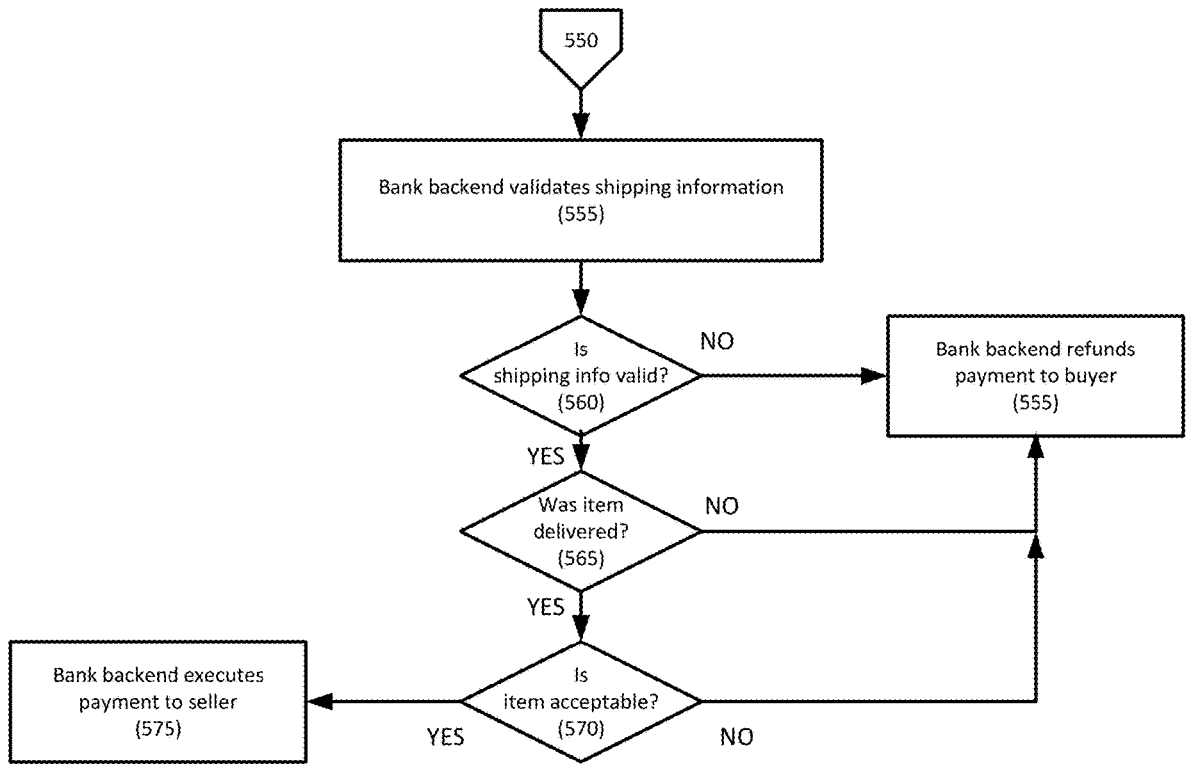

Referring to FIGS. 5A and 5B, a method for managing escrow for peer-to-peer transactions involving a shipper is disclosed according to an embodiment.

In step 505, a buyer may identify an item to purchase from a seller in an online marketplace.

In step 510, the buyer and seller may agree to transaction details including a transaction amount and agree to use a shipping service.

In step 515, the buyer may select a payment agreement option from a bank that may be integrated into the online marketplace application. In one embodiment, the seller details, transaction amount, etc. may automatically be pre-populated.

In one embodiment, the buyer may also select a payment mechanism if more than one payment mechanism is available.

In one embodiment, the buyer may verify the transaction amount and may submit the payment agreement request.

In step 520, the bank backend may move funds for transaction amount to an escrow account. In one embodiment, the escrow account may be a bank account.

In another embodiment, the bank backend may tokenize the funds and write them to an escrow account (e.g., digital wallet) on a distributed ledger network, such as a blockchain network.

In step 525, the bank backend may notify the seller that the funds were moved to an escrow account. The bank backend may also include the transaction amount.

In one embodiment, a smart contract executed by the distributed ledger network may send the notification to execute payment.

In step 530, the seller may verify the transaction amount and may provide a seller account identifier if not already provided. If the amount is incorrect, in step 535, the seller may reject the transaction or may renegotiate. If the seller rejects, in step 545, the bank backend may issue a refund from the escrow account to the buyer account.

If the buyer and seller renegotiate, in step 540, the buyer may enter a new amount into the application.

If the seller confirms the transaction amount, in step 550, the buyer may enter the buyer's shipping information and may give the item to a shipping service. For example, the bank backend may inform the shipping service that there is a package to pick up and deliver via a shipper application.

In one embodiment, the shipping service may be integrated with the bank or marketplace application.

In step 555, the bank backend may receive shipping information and may validate the shipping information.

In step 560, if the shipping information is not valid, in step 555, the bank backend may refund the payment to the buyer.

In step 565, the bank backend may also determine if the item was delivered using, for example, tracking information. If the item was not delivered, in step 555, the bank backend may refund the payment to the buyer.

In one embodiment, the shipping service may also indicate delivery using the shipper application.

In step 570, the buyer may inspect the item and confirm that the item is acceptable. If the item is acceptable, in step 575, the bank backend may execute payment to the seller.

If the item is not acceptable, in step 555, the bank backend may refund the payment to the buyer.

Figure 6:
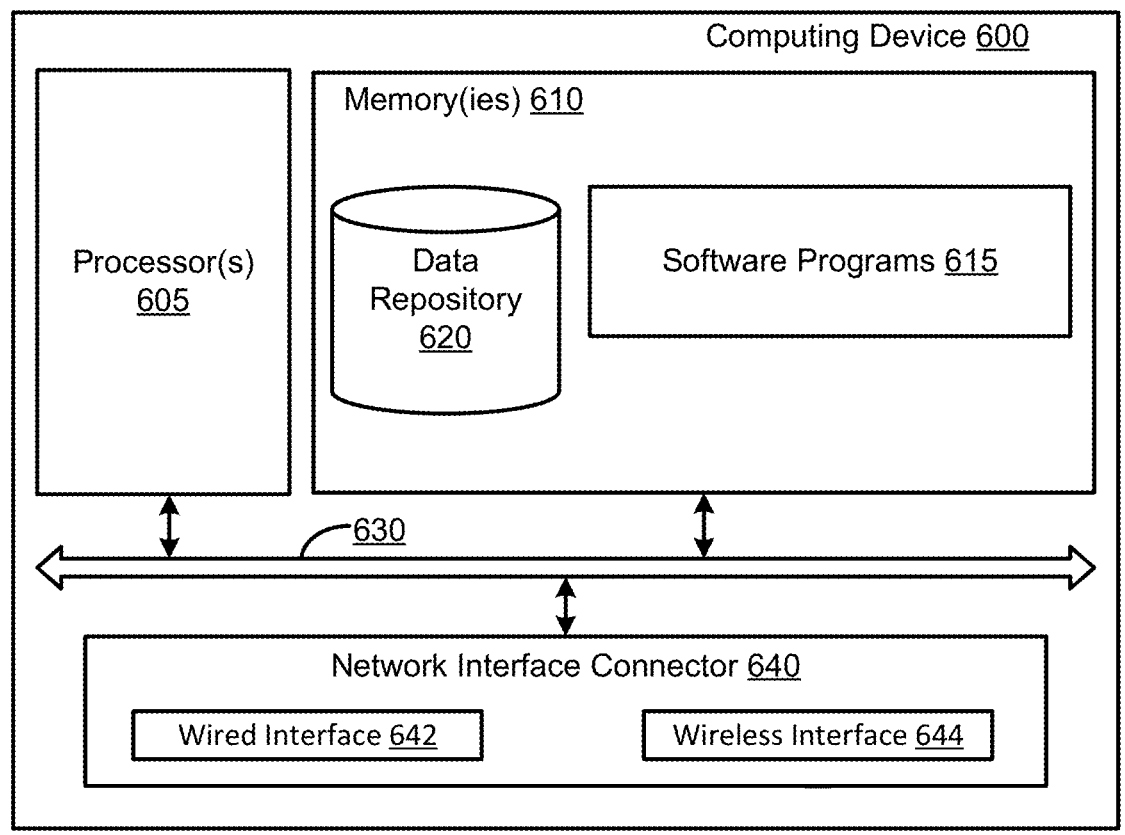
FIG. 6 depicts an exemplary computing system for implementing aspects of the present disclosure.

FIG. 6 depicts an exemplary computing system for implementing aspects of the present disclosure. FIG. 6 depicts exemplary computing device 600. Computing device 600 may represent the system components described herein. Computing device 600 may include processor 605 that may be coupled to memory 610. Memory 610 may include volatile memory. Processor 605 may execute computer-executable program code stored in memory 610, such as software programs 615. Software programs 615 may include one or more of the logical steps disclosed herein as a programmatic instruction, which may be executed by processor 605. Memory 610 may also include data repository 620, which may be nonvolatile memory for data persistence. Processor 605 and memory 610 may be coupled by bus 630. Bus 630 may also be coupled to one or more network interface connectors 640, such as wired network interface 642 or wireless network interface 644. Computing device 600 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing peer-to-peer transactions, comprising:
    receiving, at a payment agreement computer program executed by a backend and from a buyer computer program, a selection of a payment agreement option for a purchase involving a good from a seller, wherein the payment agreement option is embedded in the buyer computer program and is linked to the payment agreement computer program;
    receiving, by the payment agreement computer program and from the buyer computer program, a transaction amount and a seller account identifier;
    tokenizing, by a bank backend, the transaction amount of tokenized funds from a buyer account;
    transferring, by the payment agreement computer program, the transaction amount of tokenized funds-to an escrow account, wherein the escrow account comprises a digital wallet on a distributed ledger network;
    notifying, by the payment agreement computer program, a seller computer program for the seller that the transaction amount of tokenized funds is in the escrow account;

receiving, by the payment agreement computer program and from the seller computer program, verification that the transaction amount of tokenized funds is correct;

receiving, by the buyer computer program, an image of the good from a courier;

receiving, by the payment agreement computer program and from the buyer computer program, verification that the image of the good is acceptable;

receiving, by the payment agreement computer program and from the buyer computer program, verification that the good is acceptable;

receiving, by the payment agreement computer program and from the seller computer program, verification that the good was delivered by the courier; and transferring, by the payment agreement computer program, the transaction amount of tokenized funds from the escrow account to a seller account.

2. The method of claim 1, further comprising:
receiving, by the payment agreement computer program and from the seller computer program, an identification of the seller account.

3. The method of claim 1, further comprising:
identifying, by the payment agreement computer program, the seller account using the seller account identifier.

4. The method of claim 1, wherein the seller account identifier comprises a phone number or an email address.

5. The method of claim 1, further comprising:
receiving, by the payment agreement computer program and from the buyer computer program, an indication that the good is acceptable.

6. The method of claim 1, wherein the buyer computer program, the payment agreement computer program, and the seller computer program interface with an online marketplace.

7. A method for managing peer-to-peer transactions, comprising:
receiving, at a payment agreement computer program executed by a backend and from a buyer computer program, a selection of a payment agreement option for a purchase involving a good from a seller, wherein the payment agreement option is embedded in the buyer computer program and is linked to the payment agreement computer program;

receiving, by the payment agreement computer program and from the buyer computer program, a transaction amount and a seller account identifier;

tokenizing, by a bank backend, the transaction amount of tokenized funds from a buyer account;

transferring, by the payment agreement computer program, the transaction amount of tokenized funds to an escrow account, wherein the escrow account comprises a digital wallet on a distributed ledger network;

notifying, by the payment agreement computer program, a seller computer program for the seller that the transaction amount of tokenized funds is in the escrow account;

receiving, by the payment agreement computer program and from the seller computer program, verification that the transaction amount of tokenized funds is correct;

receiving, by the buyer computer program, an image of the good from a courier;

receiving, by the payment agreement computer program and from the buyer computer program, an indication that the good is not acceptable;

receiving, by the payment agreement computer program and from the buyer computer program, a renegotiation amount of tokenized funds;

receiving, by the payment agreement computer program and from the seller computer program, acceptance of the renegotiation amount of tokenized funds;

transferring, by the payment agreement computer program, the renegotiation amount of tokenized funds from the escrow account to a seller account; and returning, by the payment agreement computer program, a difference between the transaction amount of tokenized funds and the renegotiation amount of tokenized funds to the buyer account.

8. The method of claim 7, further comprising:
receiving, by the payment agreement computer program and from the seller computer program, an identification of the seller account.

9. The method of claim 7, further comprising:
identifying, by the payment agreement computer program, the seller account using the seller account identifier.

10. The method of claim 7, wherein the seller account identifier comprises a phone number or an email address.

11. The method of claim 7, wherein the buyer computer program, the payment agreement computer program, and the seller computer program interface with an online marketplace.

\* \* \* \* \*